United States Patent [19]

Budek

[11] 4,348,582
[45] Sep. 7, 1982

[54] COMMUNICATION VIA AN ELECTRICITY SUPPLY MAIN

[75] Inventor: Jerzy A. Budek, Bedford, England

[73] Assignee: Texas Instruments Incorporated, Dallas, Tex.

[21] Appl. No.: 20,298

[22] Filed: Mar. 14, 1979

[30] Foreign Application Priority Data

Mar. 14, 1978 [GB] United Kingdom ............... 10039/78

[51] Int. Cl.³ ............................................. H05B 1/02
[52] U.S. Cl. .................................... 219/483; 219/486; 219/507; 219/508; 307/40; 307/140; 340/310 R; 340/825
[58] Field of Search ............... 219/494, 492, 483, 486, 219/501, 508, 519, 507, 509; 340/310 A, 147 R, 147 F, 310 R; 307/38-41, 140, 34

[56] References Cited

FOREIGN PATENT DOCUMENTS

494792 11/1938 United Kingdom ............... 340/310
1500891 2/1978 United Kingdom ............... 340/310
1528457 10/1978 United Kingdom ............... 340/310

Primary Examiner—B. A. Reynolds
Assistant Examiner—M. Paschall
Attorney, Agent, or Firm—Douglas A. Lashmit; Melvin Sharp; N. Rhys Merrett

[57] ABSTRACT

Control signals are transmitted through a.c. mains supply lines to control operation of electrical equipment powered from the supply lines. A near short-circuit condition is introduced across the a.c. mains supply lines, for example, by firing a thyristor connected in series with a fuse across the supply lines, for the final portion of positive half cycles of the mains supply voltage, thus holding the voltage to a near zero value for this length of time. A receiver coupled to the mains supply lines includes a zero crossing detector circuit which responds to the near zero voltage conditions across the supply lines to perform a particular control operation on an associated appliance connected to the receiver. Different control operations may be effected by defining the control signals over a group of half cycles of the a.c. supply mains and selecting one or more half cycles of the group during which the supply voltage is reduced to the near zero level, thereby producing a sequence of selected and non-selected half cycles within the group so that by changing the sequence the particular control operation can be changed accordingly.

6 Claims, 7 Drawing Figures

COMMUNICATION VIA AN ELECTRICITY SUPPLY MAIN

This invention relates to communication via an electricity supply main and in particular to the control of electrical equipment by communication through the electricity supply main.

If an electricity consumer has a number of electrical heaters on his premises which are individually controllable, he may desire to alter a control setting, such as the temperature setting of a thermostat, depending on the time of day. He may, for example prefer his premises to be cool at night and warm during the day. This can be achieved by turning off the electricity supply to all the heaters at night. Unfortunately, however, this solution may result in his premises becoming too cold. Each heater could be fitted with a timeclock to adjust the heater thermostat setting and thus maintain the desired temperatures during both the day and night. Incorporating a timeclock into each heater would be expensive and would also be inconvenient if the need arose to alter the time of switching, as each heater timeclock would have to be adjusted separately. Clearly it would be advantageous to transmit adjustment signals from a central point to the thermostats of all the heaters.

It has been proposed to transmit control signals suitable for such an application along the conductors of the electricity supply main, but the arrangements described hitherto for such signalling are complex and expensive, and moreover are prone to interference from spurious noise pulses.

It is an object of this invention to alleviate the above difficulty.

According to a first aspect of the present invention there is provided a control system suitable for one or more electric supply mains-operated appliances including a controller effective on actuation to generate and transmit a control signal to the receiver via an alternating current electricity supply main, and
at least one receiver connected to the supply main and effective on receipt of the control signal to perform a particular control operation on an associated appliance,
wherein the control signal contains information indicative of the particular control operation to be performed on the associated appliance and is generated by holding the voltage of the electricity supply substantially to a constant value for a predetermined portion of half the supply cycle time for one or more half-cycles of the mains supply voltage.

The half-cycles, during which the voltage of the electricity supply is held substantially to a predetermined value, may be selected in a sequence, said sequence consisting of selected and non-selected half-cycles and representing the particular control operation to be performed.

The constant value may be zero volts and the control signal may be produced by diverting substantially all of the current from a mains supply conductor through a solid state switch for said portion of half the supply cycle time. The portion of the half cycles during which the voltage is held at a constant value may be adjacent zero crossing of the supply voltage.

According to a second aspect of the present invention there is provided a controller for use in a control system for one or more applicances of the type having a controller for emitting control signals, and at least one receiver effective on receipt of a control signal from the controller to control an associated appliance; wherein
said controller is effective on actuation to generate and transmit a control signal to a receiver via an alternating current electricity supply main;
the control signal indicating a control operation to be performed on an appliance and being generated by holding the voltage of the electricity supply substantially to a constant value for a predetermined portion of half the supply cycle time for one or more half cycles of the mains supply voltage.

The half cycles during which the voltage of the electricity supply is held substantially to a constant value may be selected in a sequence, said sequence consisting of selected and non-selected half-cycles and representing the control state to be assumed by an appliance.

The constant value may be zero and the control signal may be produced by diverting substantially all of the current from a mains supply conductor through a solid state switch for said portion of half the supply cycle time. The predetermined portion of the half cycle time may be adjacent the zero voltage crossings of the supply.

According to a third aspect of the present invention there is provided a receiver for use in a control system of the type having a receiver and a controller effective in actuation to generate and transmit a control signal to the receiver via an alternating current electricity supply main; said receiver being capable on receipt of the control signal of controlling an appliance; wherein the control signal indicates a control operation to be performed on an appliance, and is generated by holding the voltage of the electricity supply substantially to a constant value for a predetermined portion of half the supply cycle time for one or more half cycles of the mains supply voltage.

According to a fourth aspect of the present invention there is provided apparatus for communicating via an alternating current electricity supply main including
transmitter means including means effective to hold the mains supply voltage substantially to a constant value for a predetermined portion of the mains supply cycle time during each one of a selected sequence of half cycles, said portion ending at the zero crossing of the mains supply voltage immediately following said one of the selected sequence of half cycles;
receiver means effective to monitor the voltage of said alternating current electricity supply main and detect said sequence of half cycles;
wherein said sequence is selected according to a message being sent by the transmitter means, and the receiver means is responsive to reception of said sequence to derive the message.

The constant value may be zero and the transmitter may hold the mains supply voltage substantially to zero by diverting substantially all of the current from a main supply conductor through a solid state switch.

In order that the invention be better understood and readily carried into practice, two embodiments thereof will now be described by way of example only. Reference will be made to the accompanying drawings in which.

Figure 1:
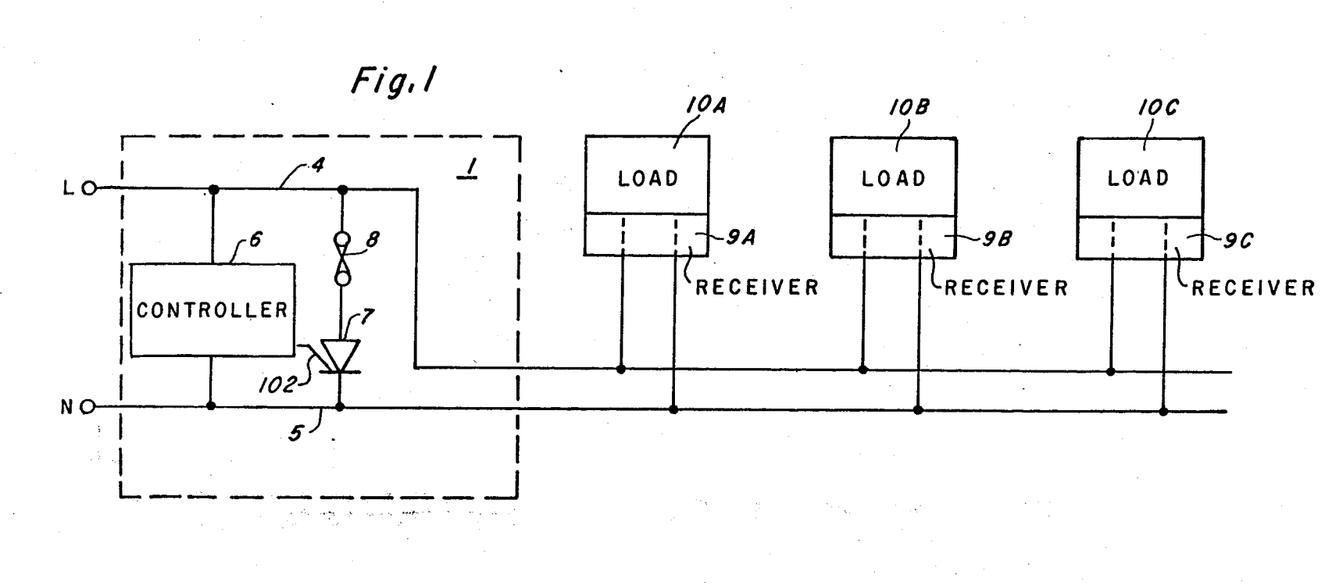
FIG. 1 is a block diagram of a centrally controlled domestic electric heating system embodying the present invention.

Referring to FIG. 1 a centrally controlled heating system consists of a controller 1 having two input terminals L and N for connection respectively to the live and neutral conductors of an electricity supply main. The controller has two output lines 2 and 3, output line 2 is connected to input terminal L by a line 4, and output line 3 is connected to the input terminal N by a line 5. Connected to receive power from the lines 4 and 5 is a control signal trigger generator 6. Also connected to the line 5 is the cathode of a thyristor 7. The anode of the thyristor 7 is connected via a fuse 8 to the line 4. The gate of the thyristor 7 is coupled to the control signal trigger generator 6 by a line 102.

The output lines 2 and 3 form the electricity main supply to three domestic panel heaters 10A–10C illustrated in FIG. 1. The panel heaters 10A–10C have receivers 9A–9C respectively associated with them. Each receiver is connected to monitor the electricity mains supply voltage to its respective panel heater. The three panel heaters illustrated in FIG. 1 may form part of a domestic central heating system.

In operation the controller 1 sends a control signal via the output lines 2 and 3 to the panel heaters 10A–10C. The voltage on the lines 2 and 3 is monitored by the receivers 9A–9C which are effective to control the heaters.

Figure 2:
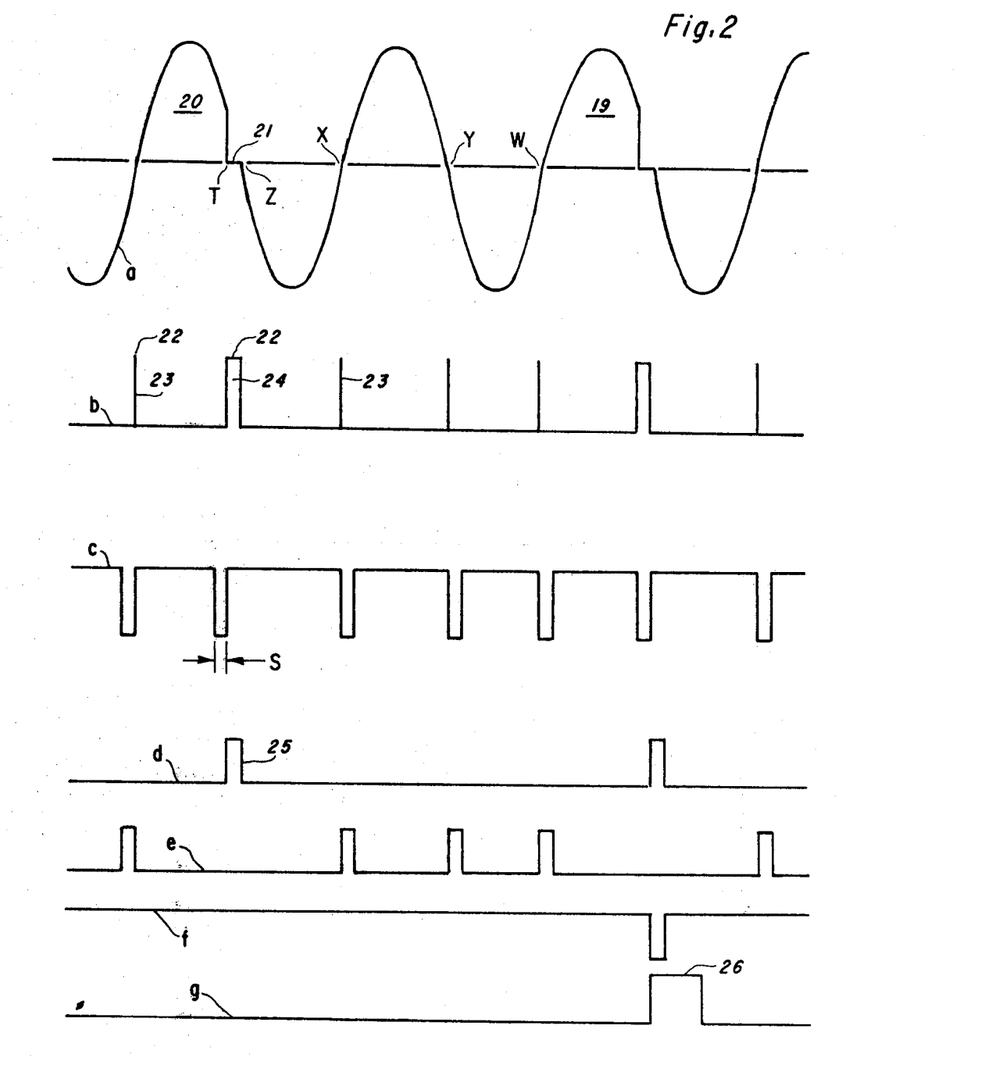
FIG. 2 is a timing diagram illustrating the operation of receivers 9A–9C of FIG. 1.

The waveform "a" depicted in FIG. 2 is a plot of supply voltage against time, measured between the lines 2 and 3. The controller 1 sends control signals to the panel heaters 10 by reducing the mains supply voltage nearly to zero for a predetermined portion, e.g. 21 in FIG. 2, preferably not greater than about 1 ms of the mains supply cycle time during each one of a selected sequence of half cycles. The sequence of half cycles selected depends on the message sent.

In this embodiment only positive half cycles are selected, thus enabling the use of a conventional unidirectional thyristor. A triac would not be used if half cycles of differing polarities were selected. The relationship between the half cycles selected and the information is as follows; a selected half cycle separated from a subsequent selected half cycle by three non-selected half cycles instructs the panel heater thermostats to switch from "low temperature" to "high temperature" and a selected half cycle separated from a subsequent selected half cycle by such non-selected half cycles instructs the panel heater threrrmostat to switch from "high temperature" to "low temperature". In FIG. 2, waveform "a" shows the mains voltage waveform while the instruction "low to high" is being communicated.

The controller 1 reduces the mains supply voltage substantially to zero by diverting current from the "live" line 4 to the "neutral" line 5. This is done by firing the thyristor 7 by means of a trigger signal from the control signal trigger generator 6. In FIG. 2 waveform "a" the thyristor is fired at a time T. It remains conductive, thus short circuiting the mains supply until the change in polarity of the voltage at a time Z. At Z the current through the thyristor reduces to zero and it becomes non-conductive until it is retriggered. The current passed by the thyristor 7 is of the order of 200 amps when it is fired, but this will vary according to the impedence of the supply main. In the event of failure of the controller 1 the fuse 8 is provided which will rupture if the thyristor remains conductive for too long, which might otherwise result in damage to or destruction of the thyristor.

Figure 3:
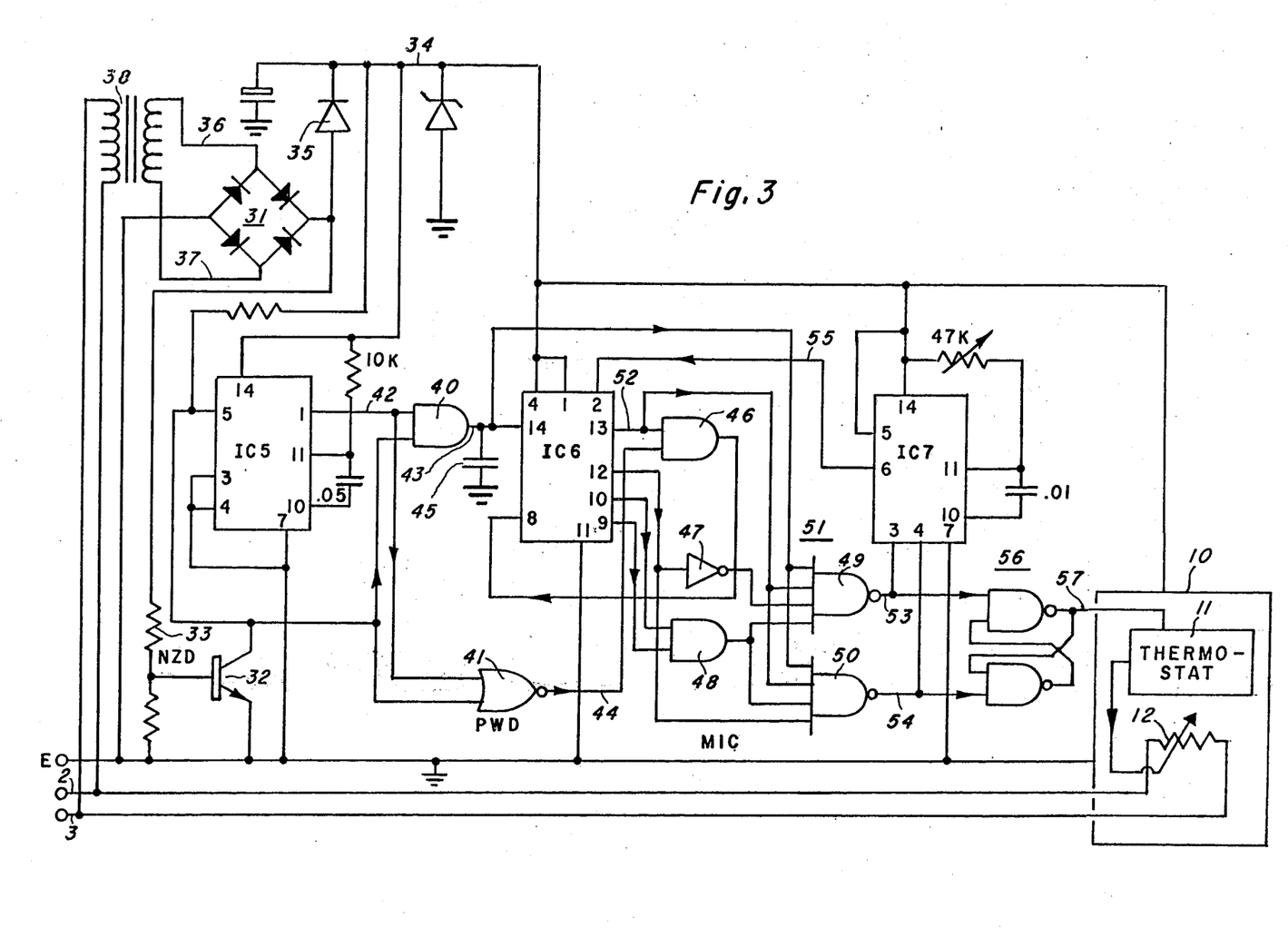
FIG. 3 is a diagram showing the circuitry of one of the receivers 9A–9C of FIG. 1.

One of the receivers 9A–9C is shown in greater detail in FIG. 3, the others being similar. It consists of a near zero detector, NZD, a pulse width discriminator PWD, and a message interpretation circuit MIC. The near zero detector NZD consists of a bridge rectifier 31 connected to the base of a transistor 32 via a current limiting resistor 33. The bridge rectifier also feeds a d.c power supply rail 34 via a diode 35. The bridge rectifier 31 is connected to a secondary winding of a transformer 38 via lines 36 and 37, the primary of which is connected via the lines 2 and 3 to the electricity supply main; see FIG. 1.

In operation the alternating voltage of the main supply is stepped down by the transformer 38, and appears between the lines 36 and 37. FIG. 2 plot "a" shows the mains waveform when a message is being transmitted. This waveform appears between the lines 36 and 37 and is full wave rectified by the bridge rectifier 31. Then it passes without smoothing via the resistor 33 to the transistor 32.

For most of each mains cycle transistor 32 is biassed ON, and hence a logical "zero" appears on its collector. When, however, the voltage between lines 36 and 37 is nearly zero there is insufficient potential developed across the base-emitter junction of transistor 32 and it ceases to conduct. When transistor 32 ceases to conduct a logical "one" appears on its collector terminal. This occurs for a short time during each zero crossing of the mains supply voltage (shown as "X" on FIG. 2), producing a short pulse 23, and for a longer time during the predetermined portion 21, producing a long pulse 24. The waveform b of FIG. 2 shows the output signal of the NZD as it appears on the collector terminal of transistor 32.

The output of the NZD is connected to the input of the pulse width discriminator (PWD). The PWD consists of an integrated circuit monostable IC5, connected to receive the output signal from the NZD; an AND gate 40, connected to receive the output from the monostable IC5 and combine it with the NZD output signal; and a NOR gate 41 similarly connected. The integrated circuit monostable is type No. SN74121, manufactured by Texas Instruments Limited.

In operation, a leading edge of a positive-going pulse at the collector of the transistor 32 causes the voltage on the output line 42, (waveform "C" in FIG. 2), to change from a logical "one" to a logical "zero" and return to a logical "one" after the expiry of a time period S. The time S is less than the width of the pulse 24. Coincident logical "ones" on line 42 and the NZD output are detected by the gate 40 to produce a logical "one" on a first PWD output line 43. Coincident logical "zeros" on line 42 and the NZD output are detected by gate 41 and produce a logical "one" on a second PWD output line 44. Line 43 thus only carries a logical "one" pulse for each long pulse 24 and line 44 carries a pulse for each short pulse 23. Waveforms "d" and "e" of FIG. 2 illustrate the first and second outputs of the PWD as they appear on the lines 43 and 44 respectively. The capacitor 45 suppresses any spurious pulses on line 43 due to relative mistiming of the signal on line 42 and the NZD output signal.

The first and second PWD output signals are fed into the message interpretation circuit (MIC). This consists of a one bit counter in IC6 connected to count pulses on the line 43. The output of the one bit counter is connected to an input of gate 46. The other input of the gate 46 is connected to receive pulses from line 44. The output of the gate 46 feeds the input of a three bit counter in IC6. An output from each bit of the three bit counter is fed into a count decoder circuit 51. Both counters are contained in the integrated circuit IC6 which is of type No. SN74L93 manufactured by Texas Instruments Limited.

In operation the trailing edge of a pulse on line 43, 25 in FIG. 2, causes an output on a line 52 from the one bit counter to change state. If it changes from a logical "zero" to a logical "one" this opens the gate 46, thus allowing pulses on the line 44 to be counted by the three bit counter. A logical "one" on the most significant bit output of the three bit counter indicates that the count is in excess of four. A logical "one" on both the least significant bit output and the middle bit output indicates that the count is either three or seven depending on the value of the most significant bit. Gate 48 is connected to produce a logical "one" output when the count is three or seven and inverter 47 is connected to produce a logical "one" output when the count is less than four.

Gate 49 is connected to produce a logical "zero" output on line 53 only when it receives a logical "one" from gate 48 and inverter 47 (i.e. the count is three) and simultaneous logical "ones" exist on lines 43 and 52. This occurs in the example illustrated in FIG. 2. Waveform f in FIG. 2 shows the voltage waveform which appears on line 53. Gate 50 is connected to produce a logical "zero" output on line 54 when it receives logical "ones" from lines 52 and 43 and the count is seven. A logical "zero" on either line 53 or line 54 triggers a monostable multivibrator IC7, which resets both counters in IC6 via a counter reset line 55. Waveform g in FIG. 2 shows a reset pulse 26 as it appears on line 55. The lines 53 and 54 are also connected to an output latch 56. A logical "zero" on line 53 causes the latch to "set" and produce a logical "one" on line 57 and once line 53 has resumed its logical "one" state a logical zero on line 54 resets the latch 56, producing a logical zero on the line 57.

To summarize the operation of one of the receivers 9A-9C of FIG. 1 and as shown in detail in FIG. 3 if a first selected half cycle 20 (FIG. 2) is followed by three zero crossings X, Y and W before the next selected half cycle 19 the latch 56 is "set". If, on the other hand, a first selected cycle is followed by seven zero crossings before the next selected cycle the latch 56 is "reset".

The output line 57 of the latch 56 is connected to an electronically controlled thermostat 11 in the panel heater 10. The thermostat is effective to regulate a heating element 12 which is powered through its connection to the mains supply 39. The thermostat 11 contains an electronic switch which is actuated via the line 57. When the voltage on line 57 is a logic "one" the thermostat is switched to "high" and when it is a logic "zero" the thermostat is switched to "low". The temperature settings for "high" and "low" are manually preselectable by means not shown.

Figure 4:
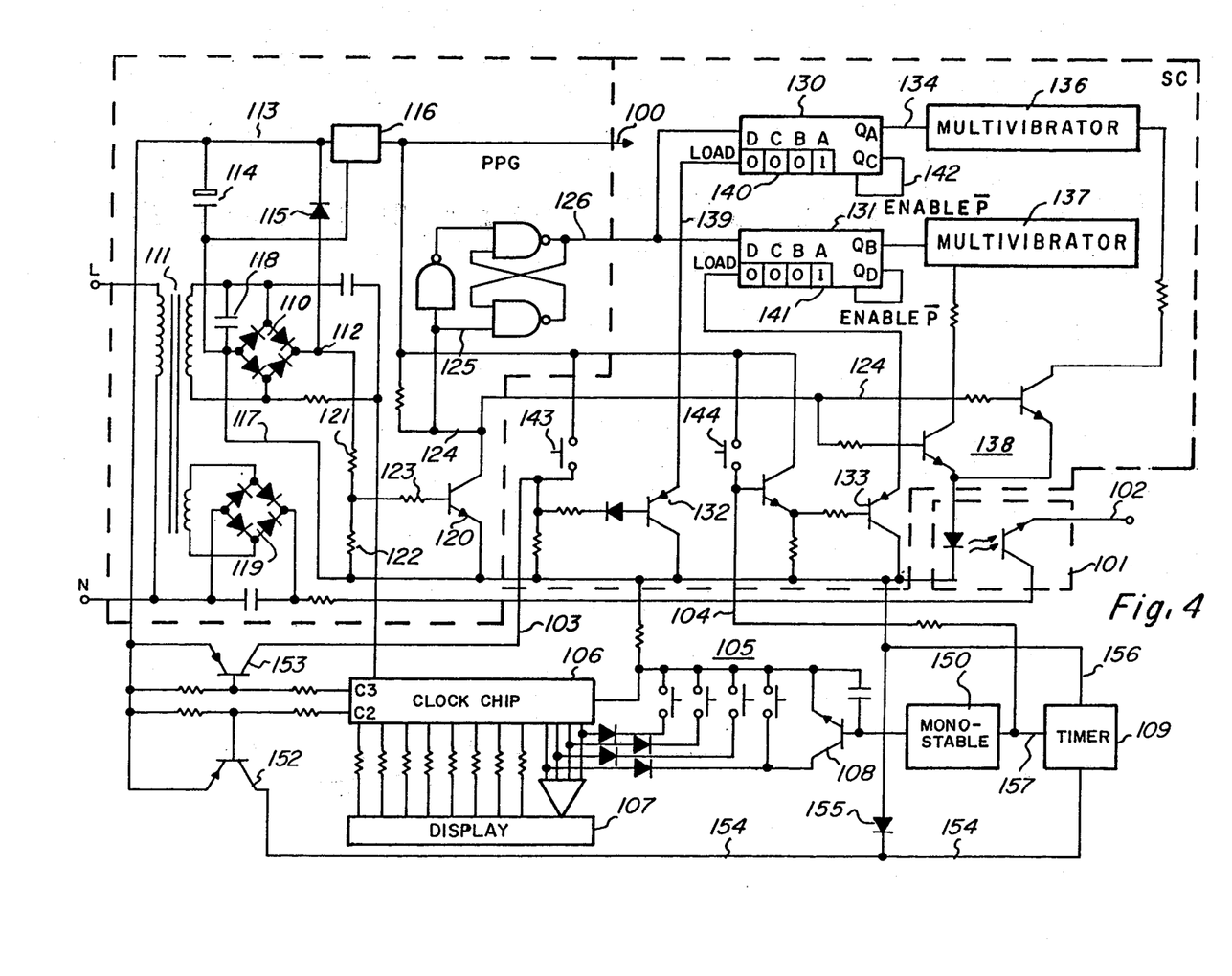
FIG. 4 is a diagram showing the circuitry of one embodiment of a control signal trigger generator 6 of FIG. 1.

FIG. 4 shows a more detailed circuit of the control signal trigger generator 6 of FIG. 1. The trigger generator 6 consists of a power supply and pulse generator section PPG. Connected to receive pulses from the PPG is a signal coding section SC. The signal coding section communicates via an opto-coupler 101 to an output line 102 and the gate of the thyristor 7 (FIG. 1). The signal coding section is actuated via two lines 103 and 104 by a clock section CK. The clock section may be programmed by input switches 105 to actuate the signal coding section at particular times of the day.

Returning to the power supply and pulse generator section PPG, a bridge rectifier 110 is connected to the mains electricity supply (L and N) via an isolating stepdown transformer 111. The positive output 112 of the bridge rectifier 110 feeds an unregulated supply rail 113, which is decoupled by capacitor 114, via a diode 115. Connected to the unregulated supply rail 113 is a supply voltage regulator 116 feeding a regulated supply rail 100. The regulated supply rail feeds most of the logic circuitry in the trigger generator, but for convenience its detailed connections are not shown in FIG. 4.

Also connected to the bridge rectifier output 112 is a near zero detector circuit consisting of a transistor 120 and its associated resistors. In operation, if the voltage on the output 112 falls below a predetermined threshold voltage the transistor 120 turns OFF, producing a logical "ONE" on its collector. The threshold voltage is dependent on the values of the resistors 121, 122 and 123 and the characteristics of the transistor 120.

It may be expected that the collector of transistor 120 would assume a logical "one" twice in each cycle of the mains supply voltage. Capacitor 118, however, prevents the voltage on output 112 from falling below the threshold on alternate mains voltage zero crossings. Thus the transistor 120 produces one logical "one" pulse in each cycle of the mains voltage. The width of the pulse is determined by the time for which the voltage on the output 112 remains below the threshold voltage.

Pulses from the collector of the transistor 120 are communicated via a line 124 to a pulse shaping latch 125 where their rising and falling edges are speeded up. From the latch 125 the pulses are passed to the signal coding section via a line 126.

A second bridge rectifier and smoothing circuit 119 is provided in the power supply and pulse generator section PPG to power the line 102 via the opto-coupler 101.

The signal coding section SC contains two 4 stage counters 130 and 131. These may be integrated circuits of type No. SN74S168, manufactured by Texas Instruments. Each counter is connected to amplifying transistors 132 and 133 respectively. Outputs from the two counters appear on lines 134 and 135 and are communicated to monostable multivibrators 136 and 137 respectively. The monostable multivibrators are in turn coupled via a gating transistor circuit 138 to the opto-coupler 101.

In operation a logical "zero" on line 103 is communicated via the transistor 132 and the line 139 to the LOAD input of the counter 130. A logical "zero" on the LOAD input causes the next pulse applied to the counter via the line 126 to set each stage of the counter 130 to a state determined by the state of its respective data input 140. Although the detailed connections are not shown in FIG. 4, the data inputs corresponding to the four stages D, C, B, A of the counter 130 are represented as having logical states 0, 0, 0, 1 respectively.

When a logical "one" appears on line 103 it is passed via the transistor 132 and the line 139 to the LOAD input of the counter 130. A logical "one" on the LOAD input isolates the counter stages from the data input and causes the pulses applied via line 126 to be counted in binary by the counter 130. Progress of the counter 130 is monitored by four "Q" output terminals, only two of which are shown in FIG. 4. A logical "one" on output terminal "$Q_A$" means that the least significant stage of the counter contains a "one".

Figure 5:
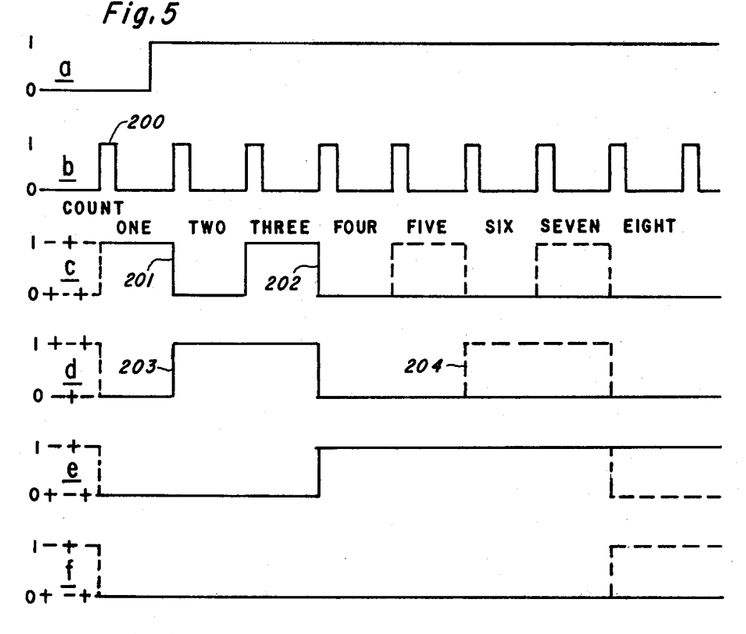
FIG. 5 is a timing diagram illustrating the operation of the generator of FIG. 4.

Referring to FIG. 5 waveform "a" shows the logical state of the line 139 of FIG. 4. When the line 139 is a logical "zero" the rising edge 200 of the pulse waveform on line 126, waveform "b" causes the counter stages D, C, B, A to assume the state represented as waveforms "f", "e", "d", "c" respectively. Once the logical state of the line 139 waveform "a" has become a logical one the stages D, C, B, A count the leading edges of the pulse waveform of waveform "b".

The counter 130 is only able to count while its ENABLE $\overline{P}$ input carries a logical "zero". The ENABLE $\overline{P}$ input of the counter 130 is connected via a line 142 to the "$Q_C$" output which is monitoring the stage C of the counter. As can be seen from waveform "e" in FIG. 5 when the count reaches four "$Q_C$" output assumes a logical "one" state and stops the counter.

The operation of the counter 131 is similar to that of the counter 130 except that it is controlled by the logic level on the line 104 instead of the line 103 and its ENABLE $\overline{P}$ input is connected to its "$Q_D$" output. Consequently following a change from a logical "zero" to a logical "one" on the line 104, the counter 131 counts up to eight before stopping. FIG. 5 may be used to illustrate the operation of counter 131. Waveform "a" represents the state of line 104 and lines c, d, e and f, the state of stages A, B, C and D of the counter. The operation of the counter 131 is shown dashed in FIG. 5 where it differs from that of the counter 130.

The monostable multivibrator 136 is connected to be triggered by every falling edge of the waveform on line 134, waveform "c" FIG. 5. Thus monostable 136 is triggered twice during the count of the counter 130; once by edge 201, FIG. 5 and once by edge 202.

The monostable multivibrator 137 is connected to be triggered by every rising edge of the waveform on line 135, waveform "d" FIG. 5. Thus monostable 136 is triggered twice during the count of the counter 131; once by edge 203 and once by edge 204.

Upon each firing of either the monostable 136 or the monostable 137 a thyristor firing pulse is transmitted from the line 124 via the gating circuit 138 and the opto-coupler 101 to the output line 102. The appearance of a logical "one" one line 103 thus causes two thyristor firing pulses to appear on line 102 separated by three zero crossings of the mains supply voltage and the appearance of a logical "one" on the line 104 causes two similar pulses but separated by seven mains zero crossings.

Closure of switch 143 causes a logical "one" to appear on the line 103, and closure of switch 143 causes a logical "one" to appear on the line 104.

The clock section, CK, consists of a digital alarm clock integrated circuit (clock chip 106) such as that manufactured by Texas Instruments and known as type No. TMS 3874 NL. The clock chip is connected to a four digit, seven segment display 107 and is programmed by manual switches 105 and transistor 108. The clock chip 106 has two alarm outputs C3 and C2 which both become active when the time displayed is equal to the time for which the alarm is set. Alarm output C3 cancels itself after approximately two minutes but output C2 has to be cancelled by operation of a stop switch S on a transistor 108. Output C2 is connected to a timer 109 which is in turn coupled to the line 104 and a monostable multivibrator 150. An output from the monostable 150 is applied to transistor 108. The timer may be a TMS 3879NC manufactured by Texas Instruments.

In operation the time displayed on the display 107 may be set by operation of either a switch H or a switch M. Closure of switch H causes the real time hours display to progress at a rate of approximately 1 hour every half second. Similarly closure of switch M causes the minutes display to progress at a rate of approximately 1 minute every half second. Closure of a switch A causes the display to show the displayed time at which the alarm outputs are due to be activated. If the switches M or H is closed at the same time as the switch A the displayed time at which the alarm is due to be activated progresses at an accelerated rate as described above.

Figure 6:
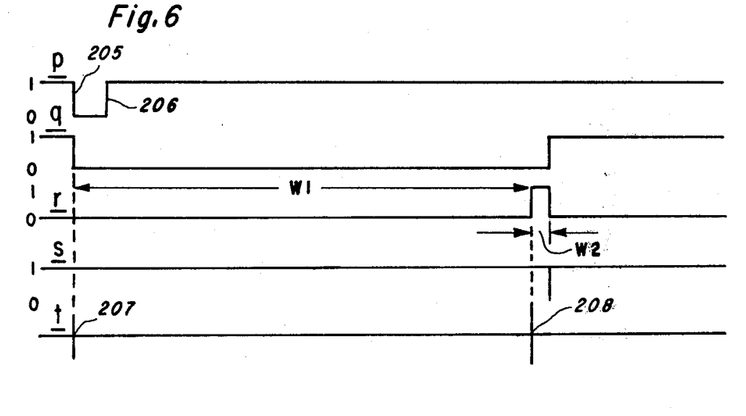
FIG. 6 is a timing diagram illustrating the operation of the domestic heating system of FIG. 1.

When alarm output C3 shown as waveform p in FIG. 6 is activated, for example at time 205 it sinks a current from transistor 153, thus turning the transistor on and causing a logical "one" to appear on line 103. Output C3 cancels itself at a time 206. Similarly activation of alarm output C2, represented by waveform "q" of FIG. 6, draws current through transistor 152 thus causing a current to flow in a line 154 and a stabilized voltage to appear across a zener diode 155. The stabilized voltage is applied to the power supply of the timer 109 via lines 156 and 154. After a first predetermined timing period $W_1$ a logical "one" appears on line 157 as shown in waveform "q" and hence line 104. After a much shorter second predetermined timing period $W_2$ the logical "one" is replaced by a logical "zero". This transition fires the monostable multivibrator 150, which produces a pulse shown in waveform "s", cancelling the C2 alarm output via transistor 108.

Finally waveform "t" shows the times when the clock section CK actuates the signal coding section SC. The first actuation 207 causes a pair of thyristor firing pulses separated by three mains zero crossings to appear on the terminal, and the second actuation 208 causes a pair of firing pulses separated by seven mains zero crossings.

Relating the above description of the control signal trigger generator back to the heating system of FIG. 1 it will be apparent that at a time determined by the alarm setting of the clock chip 106 the panel heaters 10A-10C will have their thermostats switched from "low" to "high". After the expiry of a timing period determined by the timer 109 the thermostats will be switched back to "low". The clock 106 and timer 109 can be over-ridden by manual operation of the switches 143 and 144.

Modifications of the embodiment described above will be apparent. For example the lines 103 and 104 in FIG. 4 could be interchanged. Then when the alarm outputs of the clock chip 106 are activated the thermostats are instructed to switch from "high" to "low". They will, of course, return to "high" after the expiry of the timing period of timer 109.

Whereas the clock section CK described employs an electronic digital clock chip 106 and display 107, the clock section could be mechanical. The lines 103 and 104 could be energized at various times of the day by electrical contacts operated by the mechanical clock mechanism. Such mechanisms are well known.

It must also be appreciated that the clock section could be replaced by a central thermostat. The thermostat could alternately energize lines 103 and 104 to switch the heater elements off and on to maintain a desired house temperature.

The sequence of selected and non selected cycles forming the control signal may be changed without departing from the invention.

Indeed a domestic heating system embodying the invention could use heaters with more than two control states, in which case a corresponding number of sequences would be required.

Examples of other sequences and the modifications required to produce them are described below with reference to an alternative embodiment of the invention.

In an alternative embodiment the blocks shown 10A, 10B and 10C in FIG. 1 are different electrical appliances. For example 10A is a light, 10B an electric blanket and 10C an electronic door lock.

Each domestic appliance has its own characteristic set of instructions which appear as the control signal. The domestic appliance 10A, has a receiver 9A which is programmed to respond only to instructions pertaining to that appliance. Modifications of the receiver of FIG. 3 and the generator of FIG. 4 to achieve this will be described below.

A set of control signal codes for use in this embodiment are given below:

| CODE | INSTRUCTION |
| --- | --- |
| 10001 | Switch electric blanket "on" |
| 1 (seven "0"s) 1 | Switch electric blanket "off" |
| 1 (eleven "0"s) 1 | Switch light "on" |
| 1 (fifteen "0"s) 1 | Switch light "off" |
| 1 (nineteen "0"s) 1 | Lock door |
| 1 (twenty three "0"s) 1 | Unlock door | where "1" represents a selected half cycle and "0" a non-selected half cycle.

Figure 7:
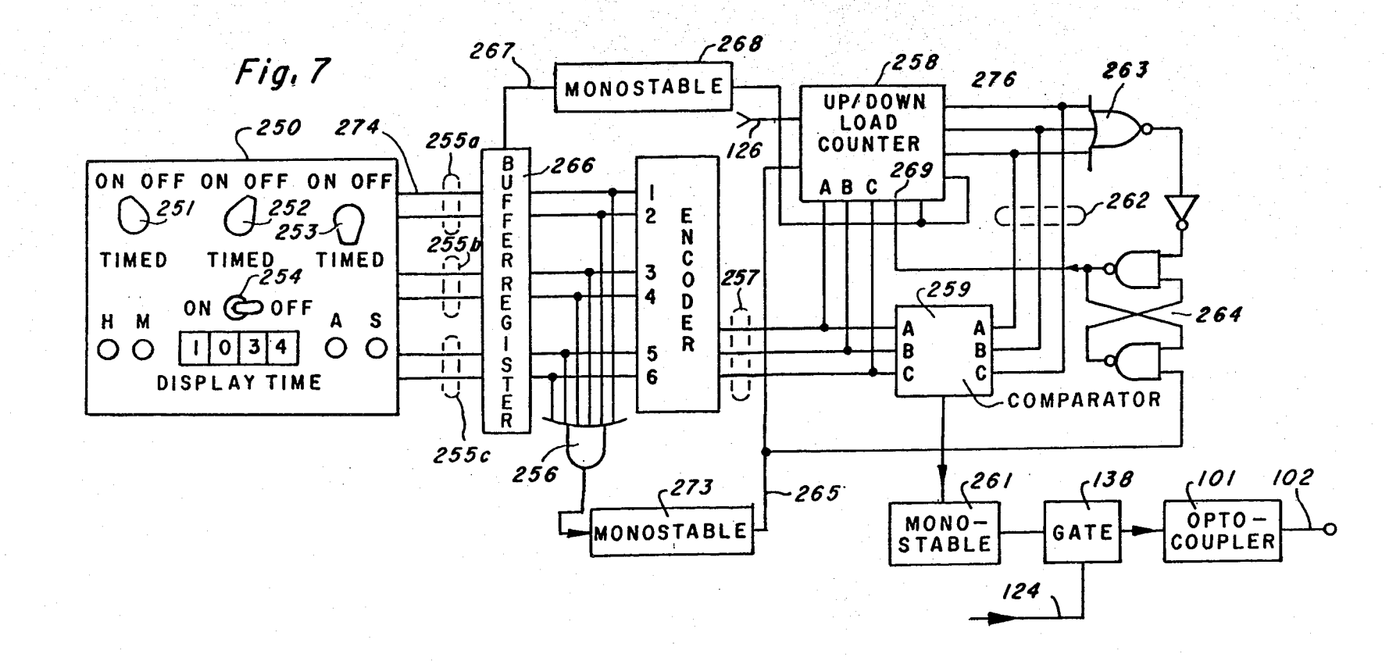
FIG. 7 is a circuit diagram illustrating the differences between the control signal trigger generator of the first and second embodiments.

Referring to FIG. 7 a control signal trigger generator 250 contains a control and timing module having three manually operated 3-way switches 251, 252 and 253 and a two-way switch 254 and a digital alarm clock. Four push button switches are provided for setting the clock, the operation of which is the same as the clock in the clock section of the FIG. 4 embodiment. The three positions of switches 251 to 253 are "ON", "OFF" and "TIMED". Each three way switch has a pair of output lines 255a–255c. One of a particular pair is energised with a logical "one" when its corresponding switch is moved to the "ON" position and the other is energized when the switch is in the "OFF" position. When one of the three way switches is switched to the "TIMED" position the clock causes one of the pair to be energized when the clock alarm is energized. Which one is energized depends on the setting of a two way switch 254. The other line of the pair may be energized after expiry of the period of a timer circuit such as that shown in FIG. 4 as 109. The three pairs of lines 255a to 255c are connected via a buffer register 266 to an encoder 272 and an OR gate 256. The encoder is coupled to an up-/down counter 258 and an input of a three bit comparator 259. The other input of the comparator is derived from the output of the up/down counter 276 via lines 262 which are also connected to a NOR gate 263. The output of the NOR gate 263 is coupled via an inverter and a latch 264 to the up/down control input 269 of the counter 258. The latch is also connected to be operated via a line 265 and a monostable multivibrator 273 by the output of the OR gate 258. The line 255 is also connected to the "load" input of the up/down counter 258.

The comparator 259 produces an output which is communicated via line 260 to a monostable multivibrator 261. The monostable 261 is in turn coupled to the output line 102 via the gating circuit 138 and the optocoupler 101.

It must be appreciated that FIG. 7 shows differences between the alternative embodiment and the embodiment of FIG. 4. Consequently it does not show in detail features which are common to both embodiments.

The buffer register contains 6 stages each of which is capable of being set by a rising edge on its corresponding input line. All six stages are capable of being reset by a pulse from a monostable multivibrator 268 applied via line 267. The monostable 268 is connected to be triggered by the output of the counter 258 corresponding to its most significant bit.

In operation movement of switch 251 to the "ON" position causes the "ON" line 274 of the pair 255a to become energized to a logical "one" state. This sets its respective stage of latch 266 to produce a logical "one" which is communicated to the gate 256 and the encoder 272. The encoder translates a logical 1 on its "1" input to a binary word representing "1" i.e. "001", which it communicates to the up/down counter 258 and the comparator 259 via lines 257. Upon receipt of the logical "one" the OR gate 256 produces a logical "one" the OR gate 256 produces a logical "one" output. This triggers the monostable 273 and resets the count direction latch 264. With latch 264 reset a logical zero is applied to the counter up/down control input instructing it to count down.

The presence of the logical "zero" on the load input of the counter 258 causes a binary word applied to data inputs 273 to be loaded on the next clock pulse received via line 126. A "zero" is loaded into the most significant bit. Once loaded the binary word appears on the counter output terminal. Immediately the comparator 259 registers that the words on lines 257 and lines 262 are equal and produces a logical "one" on line 260. This causes the monostable 261 momentarily to open the gate 138 to let one thyristor firing pulse to be transferred from the line 124 to the output line 102.

The next pulse on line 126 following the resumption of a logical "one" on line 265 causes the counter to count down one thus altering its output word from "001" to "000". Gate 263 detects the word "000" and sets the direction latch 264 to instruct the counter to count up. The next pulse on line 126 thus causes the output to return to "001" and cause an output from the comparator 259. This triggers the monostable 261 and allows another thyristor firing pulse to be transmitted to the terminal 102. Subsequent pulses on the line 126 cause the counter to count upwards. When the fourth bit is set to a logical 1, further counting is inhibited.

To summarize, operation of switch 251 has caused two thyristor firing pulses to be generated. They are separated by three mains zero crossings as pulses only appear on line 126 every other mains zero crossing.

According to the coding used for the control signal used in this alternative embodiment movement of switch 25, to "ON" switches the electric blanket on.

Movement of switch 25, to "OFF" causes the "2" input of the encoder to be activated. In a similar manner to that described above initially the comparator registers on equality. The counter then counts 1,0,1,2 whereupon the comparator registers again. Thus two thyristor firing pulses appear on line 102 separated by seven zero crossings. This instructs the electric blanket to turn "OFF".

Switch 252 operates a light and switch 253 a door catch by a similar method.

If an extra bit is cascaded with the three bit counter in IC6 and the gates 49 and 50 inhibited until the count exceeds eight, outputs will appear on lines 53 and 54 when selected cycles are separated by eleven and fifteen zero crossings respectively.

Addition of further bits can extend the count so that gates 49 and 50 respond to nineteen and twenty three respectively. The receiver of FIG. 3 can easily be modified to control a domestic appliance with more than two control states by adding extra gates in the count decode circuit 51, extra counter bits, and extra gates in the latch 56 to make it a latch with as many states as are required for the domestic appliance.

The detailed implementation of such modifications will be apparent to one skilled in the art.

The alternative embodiment can be used to control other domestic appliances. For example an automatic tea making machine can be made to operate at dawn, garage doors could be opened remotely or at a time when a vehicle is expected.

Apparatus for communicating via an electricity supply main embodying the invention can also be applied to control other than domestic electrical appliances. For example a power station could produce a control signal which instructs a substation to shed part of its load.

Whereas the embodiments described above have concerned the control of appliances it must be realised that apparatus according to the invention could be used to communicate any message provided a sufficient number of possible different sequences are provided.

In the specific embodiments of a receiver and a transmitter described above transformers are used to derive voltage supplies from the supply mains. The cost of the apparatus could be reduced by replacing the transformers by suitable resistors to lower the voltage of the mains supply to a value appropriate to the operation of the circuits described.

The code generating circuits of the transmitter and the detection circuits of the receiver could each be formed mainly, if not totally, as one or two integrated circuits, instead of from a mixture of integrated circuits and discrete components. One of the integrated circuits of the detection circuits of the receiver, when formed in this way, could be made programmable, either during production or before use, so as to respond to particular code combinations.

The code generating circuits of the transmitter may include a microprocessor if a large number of different code combinations is required, for example, for the control of many different appliances; in this case the microprocessor would not only generate the different codes required but also provide the time keeping function.

What is claimed is:

1. A control system for remotely controlling at least one alternating current electric-mains-operated appliance, including:
    a controller having electronic switch means for superimposing a control signal on an alternating current mains supply by interrupting the mains supply for a period adjacent a zero crossing in one or more selected half-cycles of the mains supply and substantially less than the mains supply cycle period thereby to hold the mains supply voltage substantially at zero during said interruption;
    at least one receiver means for monitoring the mains supply and for controlling said electrical appliance said receiver having
        (A) interruption detector means including a full wave rectifier means for providing a full-wave rectified signal from said mains supply; voltage threshold detector means for receiving said full-wave rectified signal and producing an output whenever the voltage of said full-wave rectified signal is lower than a threshold voltage; and means for responding to the durations of said outputs from said voltage threshold detector means to produce an indication of the occurrence of a said interruption; and
        (b) means responsive to said indications of the occurrence of an interruption to produce outputs for controlling said electric appliance in accordance with the control signal from the controller.

2. A control system for remotely controlling one or more alternating current electric-mains-operated appliances, including:
    a controller having electronic switch means for superimposing a control signal on an alternating current mains supply by interrupting the mains supply for a period adjacent a zero crossing in one or more selected half-cycles of a group of half-cycles of the mains supply and substantially less than the mains supply cycle period thereby to hold the mains supply voltage substantially at zero during the or each said interruption for producing a control signal comprising a sequence of selected and non-selected half-cycles in said group, the particular sequence characterizing an individual control signal;
    at least one receiver means for monitoring the mains supply and for controlling the or each electrical appliance to which it is connected; said receiver having:
        (A) interruption detector means including a full wave rectifier means for providing a full-wave rectified signal from said mains supply; voltage threshold detector means for receiving said full-wave rectified signal and producing an output whenever the voltage of said full-wave rectified signal is lower than a threshold voltage; and means for responding to the duration of said outputs from said voltage threshold detector means to produce an indication of the occurrence of a said interruption; and
        (B) means responsive to said indication of the occurrence of an interruption to produce outputs for controlling said electric appliance in accordance with the control signal from the controller.

3. A control system according to claim 2, wherein the controller includes:
    detector means for detecting when the mains supply phase is within a predetermined phase difference from a zero crossing; counter means for counting half-cycles or integral multiples of half-cycles of the mains supply;

selector means connected to the counter means and the detector means for selecting particular half-cycles in a sequence dependent on the control operation and the appliance to be controlled and for producing a trigger signal to initiate an interruption in each selected half-cycle;

and wherein the electronic switch means is a semiconductor switching device connected to receive and respond to the trigger signal to short-circuit the mains supply until the next occuring zero crossing.

4. A system according to claim 3, wherein the controller includes manually settable means representing various control operations and/or appliances in response to setting of which the said sequence is selected.

5. A control system according to any of claims 2, 3 or 4, further including clock means programmable to instruct the controller to signal to the or each receiver to perform a control operation on its associated appliance(s) at a particular time.

6. A control system according to claim 2, wherein said electronic switch means comprises a gate controlled semiconductor device.

* * * * *